(12) United States Patent
Fukuda et al.

(10) Patent No.: US 9,372,595 B2
(45) Date of Patent: Jun. 21, 2016

(54) SURFACE TEXTURE MEASUREMENT DEVICE

(71) Applicant: MITUTOYO CORPORATION, Kanagawa (JP)

(72) Inventors: Megumi Fukuda, Miyazaki (JP); Hiroyuki Hidaka, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 325 days.

(21) Appl. No.: 13/781,949

(22) Filed: Mar. 1, 2013

(65) Prior Publication Data

US 2013/0246959 A1   Sep. 19, 2013

(30) Foreign Application Priority Data

Mar. 19, 2012   (JP) ................................. 2012-062281

(51) Int. Cl.
| | |
|---|---|
| *G06F 3/0481* | (2013.01) |
| *G01B 7/34* | (2006.01) |
| *G06F 9/44* | (2006.01) |
| *G01B 21/30* | (2006.01) |
| G05B 19/042 | (2006.01) |

(52) U.S. Cl.
CPC .............. *G06F 3/04817* (2013.01); *G01B 7/34* (2013.01); *G01B 21/30* (2013.01); *G06F 3/0481* (2013.01); *G06F 8/34* (2013.01); *G05B 19/0426* (2013.01); *G05B 2219/23258* (2013.01)

(58) Field of Classification Search
CPC ..... G06F 3/0481; G06F 3/04847; G06F 8/34; G05B 2219/23258; G05B 19/0426
See application file for complete search history.

(56) References Cited

U.S. PATENT DOCUMENTS

| | | | |
|---|---|---|---|
| 6,892,081 B1* | 5/2005 | Elomaa ...................... | 455/575.1 |
| 7,683,907 B2 | 3/2010 | Tashiro | |
| 8,196,457 B2 | 6/2012 | Hidaka et al. | |
| 8,347,697 B2 | 1/2013 | Sakata et al. | |
| 8,359,908 B2 | 1/2013 | Yamada et al. | |
| 2006/0229557 A1* | 10/2006 | Fathallah et al. ............. | 604/131 |
| 2007/0200856 A1 | 8/2007 | Tashiro | |
| 2009/0049893 A1 | 2/2009 | Hidaka et al. | |
| 2011/0197665 A1* | 8/2011 | Sakata et al. .................... | 73/105 |
| 2011/0199629 A1* | 8/2011 | Sensu ................ | H04N 1/00411 358/1.13 |

(Continued)

FOREIGN PATENT DOCUMENTS

| | | |
|---|---|---|
| JP | 10-226142 | 8/1998 |
| JP | 2000-227327 | 8/2000 |

(Continued)

OTHER PUBLICATIONS

U.S. Appl. No. 13/780,705 to Hiroomi Honda et al., filed Feb. 28, 2013.

(Continued)

*Primary Examiner* — Tadeese Hailu
*Assistant Examiner* — Shangao Zhang
(74) *Attorney, Agent, or Firm* — Greenblum & Bernstein, P.L.C.

(57) ABSTRACT

A surface texture measurement device displays in a display an operation screen based on display information of a current operation screen, and displays in the display a guidance screen when guidance display is requested by pressing a guidance screen display button on the operation screen. The operation screen has icon display for one or more buttons that activate predetermined functions. The guidance screen has a button list field that displays a list of icon display and function name display for the buttons included in the current operation screen and a description display field that displays a function description for any of the buttons included in the current operation screen.

8 Claims, 12 Drawing Sheets

(56) References Cited

U.S. PATENT DOCUMENTS

| | | | |
|---|---|---|---|
| 2011/0213609 A1* | 9/2011 | Cowen et al. | 704/9 |
| 2012/0036435 A1* | 2/2012 | Yang et al. | 715/702 |
| 2012/0227476 A1 | 9/2012 | Nakayama | |
| 2012/0234075 A1 | 9/2012 | Omori et al. | |
| 2012/0266475 A1 | 10/2012 | Nakayama et al. | |
| 2013/0081246 A1* | 4/2013 | Case | B23Q 17/20 29/407.01 |
| 2013/0133409 A1 | 5/2013 | Nakayama et al. | |

FOREIGN PATENT DOCUMENTS

| | | |
|---|---|---|
| JP | 2003-194702 | 7/2003 |
| JP | 2003-232797 | 8/2003 |
| JP | 2007-223236 | 9/2007 |
| JP | 2009-025080 | 2/2009 |
| JP | 2011-169616 | 9/2011 |

OTHER PUBLICATIONS

U.S. Appl. No. 13/781,934 to Toshihiro Kanematsu et al., filed Mar. 1, 2013.

Search report from E.P.O., mail date is Jun. 7, 2013.

Office Action issued in Japan family member Patent Appl. No. 2012-062281, dated Jan. 12, 2016.

Office Action issued in Japan family member Patent Appl. No. 2012-062281, dated Mar. 22, 2016.

* cited by examiner

| Operation screen list | | | | |
|---|---|---|---|---|
| ID symbol | Screen format | Display item | Display button designation | No. of buttons |
| F001 | (Image data) | Ra value, Graph… | B001,B002,… | 7 |
| F002 | (Image data) | Ra, Rq, Rz… | B002,B051… | 11 |
| … | … | … | … | … |

Fig. 4

| Operation button list | | | | | | |
|---|---|---|---|---|---|---|
| ID symbol | Function | Graphic display icon | Text display icon | Function name | Function description | |
| B001 | (Processing) | (Image data) | (Image data) | "Switch Prof." | "Switch profile display." | |
| B002 | (Processing) | (Image data) | (Image data) | "Switch Range" | "Switch measurement range." | |
| ... | ... | ... | ... | ... | ... | |
| 61 | 62 | 63 | 64J | 65J | 66J | |

60

64 → 64J, 64E, 64C
65 → 65J, 65E, 65C
66 → 66J, 66E, 66C

SURFACE TEXTURE MEASUREMENT DEVICE

CROSS-REFERENCE TO RELATED APPLICATIONS

The present application claims priority under 35 U.S.C. §119 of Japanese Application No. 2012-062281, filed on Mar. 19, 2012, the disclosure of which is expressly incorporated by reference herein in its entirety.

BACKGROUND OF THE INVENTION

1. Field of the Invention

The present invention relates to a surface texture measurement device, especially a portable surface texture measurement device.

2. Description of Related Art

Conventionally, a surface texture measurement device has been known to measure surface texture, such as surface roughness and surface shape of a work piece (see Related Art 1, for example). The device traces a surface of the work piece with a stylus that is in contact with the surface of the work piece, displaces the stylus in a direction intersecting with a tracing direction according to the surface texture of the work piece, and measures the surface texture of the work piece based on a displacement amount of the stylus.

The surface texture measurement device can switch between performing a measurement of micro-unevenness (surface roughness) and a wide range measurement such as a measurement of undulation or a contour of the surface of the work piece. Further, the surface texture measurement device can perform and display tallying or statistical processing of measured data. Especially, the small surface texture measurement device shown in Related Art 1 is integrally provided with various functions described above and is thus able to perform the various measurements in a single unit. Taking advantage of its portability, such a small surface texture measurement device is carried to and used for measurement at various sites.

When the small surface texture measurement device having multiple functions is used, consideration must be given to displayability and operability with respect to a user operating the device. For instance, in the surface texture measurement device, due to the small size, a display size in a main body is restricted and an amount of information displayable at once is thus limited. Thus, a user interface using an abbreviated word or an icon is often employed. However, since such a surface texture measurement device has multiple functions, a wide variety of content is displayed, which results in a great number of similar abbreviated words and icons. Accordingly, even an experienced user may have difficulty in identifying the abbreviated words and icons, and an inexperienced user or a user who seldom operates the device may not be able to understand the abbreviated words or icons.

An operation manual may be referred to in order to assist with identification of such abbreviated words and icons. For the case of the small surface texture measurement device that is carried to a measurement site, however, even a simple field manual may be difficult for the user to carry together with the device or to refer to during a measurement, resulting in lowered work efficiency.

In order to address such a circumstance, a function that displays descriptions on a screen, that is, a guidance screen or a help screen, is known. In Related Art 2, a help button corresponding to each parameter is arranged on a display condition setting screen of a particle size distribution measurement device, and a screen of descriptive text (guidance) for the corresponding parameter is displayed when the button is operated.

A technology in Related Art 3 provides a help key as one of a plurality of operation keys in an electronic device such as a label printer used at a shop, displays a "list of guidance" on a display when the help key is operated, and then displays guidance for each function on the screen when an "unclear operation key" item is selected from the list. A technology in Related Art 4 provides a help key as one of a plurality of operation keys in an electronic device such as a copier or a facsimile machine, displays a "first help screen" (list display screen) in a display when the help key is operated, and displays a "second help screen" for each function (such as a guidance screen for document size selection) when a desired item is selected from the list.

Related Art 1: Japanese Patent Laid-Open Publication No. 2011-169616
Related Art 2: Japanese Patent Laid-Open Publication No. 2003-194702
Related Art 3: Japanese Patent Laid-Open Publication No. H10-226142
Related Art 4: Japanese Patent Laid-Open Publication No. 2007-223236

As described above, a help function or a guidance function that displays operation instructions on a screen are technologies known in Related Arts 2 to 4. However, the technologies of Related Arts 2 to 4 are each applied to a stationary device that has ample space in a display screen, and cannot be fully accommodated in a small display screen in a small device such as in Related Art 1. For example, although a help button is provided for each function in Related Art 2, there is not enough space in the small display screen to accommodate a large number of buttons having similar functions.

Further, in Related Arts 3 and 4, similar to a help function used in a personal computer and the like, guidance for each item is displayed through a guidance menu screen (the list of guidance, the first help screen, or the like) that displays a list of guidance items. Accordingly, one operation is not enough to lead to the desired guidance, and thus the technology is difficult to employ from a viewpoint of work efficiency. In particular, to display the guidance menu screen having a large number of items on the small display screen in Related Art 1, switching between a plurality of pages may be required even for the guidance menu screen only.

SUMMARY OF THE INVENTION

A main advantage of the present invention is to efficiently display necessary and sufficient guidance items in a portable surface texture measurement device having a small display screen.

The present invention is a portable surface texture measurement device including: a display; an operation portion; and a controller that displays in the display an operation screen and a guidance screen based on an operation of the operation portion. The controller displays the operation screen in the display based on display information in a current operation screen, and displays the guidance screen in the display based on a request for guidance display with respect to the operation portion. The operation screen includes icon display for at least one button that activates a predetermined function. The guidance screen includes a button list field displaying as a list an icon and a function name for the button included in the current operation screen, and a description display field displaying a function description for any button included in the current operation screen.

In the present invention described above, the operation screen is displayed on the display of the surface texture measurement device according to a current status of the surface texture measurement device. When a request for guidance display is made through the operation portion in such a state, the guidance screen is displayed according to the current operation screen. In the guidance screen, the icon for the button included in the operation screen and the function name of the button are displayed in the button list field. Accordingly, when a user cannot identify the function of any button displayed as an icon on the operation screen, the user can identify the function of each button from the function name of each button displayed in the button list on the guidance screen. Furthermore, in a case where the button function cannot be identified from the function name only, a detailed description for the button function is displayed in the description display field when the user specifies the button in the button list field. Thereby, guidance for the function of each button can be provided to the user.

According to the present invention described above, the user can immediately identify the button function based on the function name of the displayed button in the button list field on the guidance screen first called up from the operation screen. Furthermore, even when the user cannot identify the button function based on the function name only, the function description is displayed by specifying the button. This allows the user to see a detailed description on the same guidance screen and to identify details without further switching screens from the guidance screen. Accordingly, even in the portable surface texture measurement device having the small display screen, necessary and sufficient guidance items can be efficiently displayed.

In the present invention, the guidance screen is desirably displayed in a single page display format when the number of buttons included in the current operation screen is equal to or less than a maximum button number for the button list field, and is desirably displayed in a multiple page display format when the number of buttons included in the current operation screen is more than the maximum button number for the button list field.

According to the present invention described above, the single page display format is used for display when the number of buttons is equal to or less than the maximum button number for the button list field. The details can thus be recognized without switching screens from the guidance screen as described above. The small surface texture measurement device according to the present invention basically has a small screen and a relatively small number of buttons displayed in the operation screen. Thus, many of the operation screens can be displayed in the single page display format described above, and the maximum button number can also be set so as to achieve this. On the other hand, even when the number of buttons must be equal to or more than the maximum button number of the operation screen, a guidance screen that switches pages can be provided by use of the multiple page display format. Such a situation can be a rare case in the small surface texture measurement device having the small operation screen and can be kept within a range that does not affect overall display efficiency of the guidance screen.

In the present invention, either one of a graphic display icon that shows the button function with graphics and a text display icon that shows the button function with abbreviated words is desirably selected for the icon display based on a system setting. According to the present invention described above, either the graphic display icon or the text display icon can be selected for the icon display of the buttons in the operation screen according to the user's preference. This selection may be set by the user as the system setting in advance, similar to many other function settings.

In the present invention, the function name and the function description are each desirably selected from a plurality of display languages based on the system setting. According to the present invention described above, the function name and the function description on the guidance screen can be selected from languages such as Japanese, English, Chinese, Spanish, and the like according to the user's preference. This selection may be set by the user as the system setting in advance, similar to many other function settings.

BRIEF DESCRIPTION OF THE DRAWINGS

The present invention is farther described in the detailed description which follows, in reference to the noted plurality of drawings by way of non-limiting examples of exemplary embodiments of the present invention, in which like reference numerals represent similar parts throughout the several views of the drawings, and wherein:

FIG. 4 is a schematic diagram of an operation button list used in the embodiment;

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
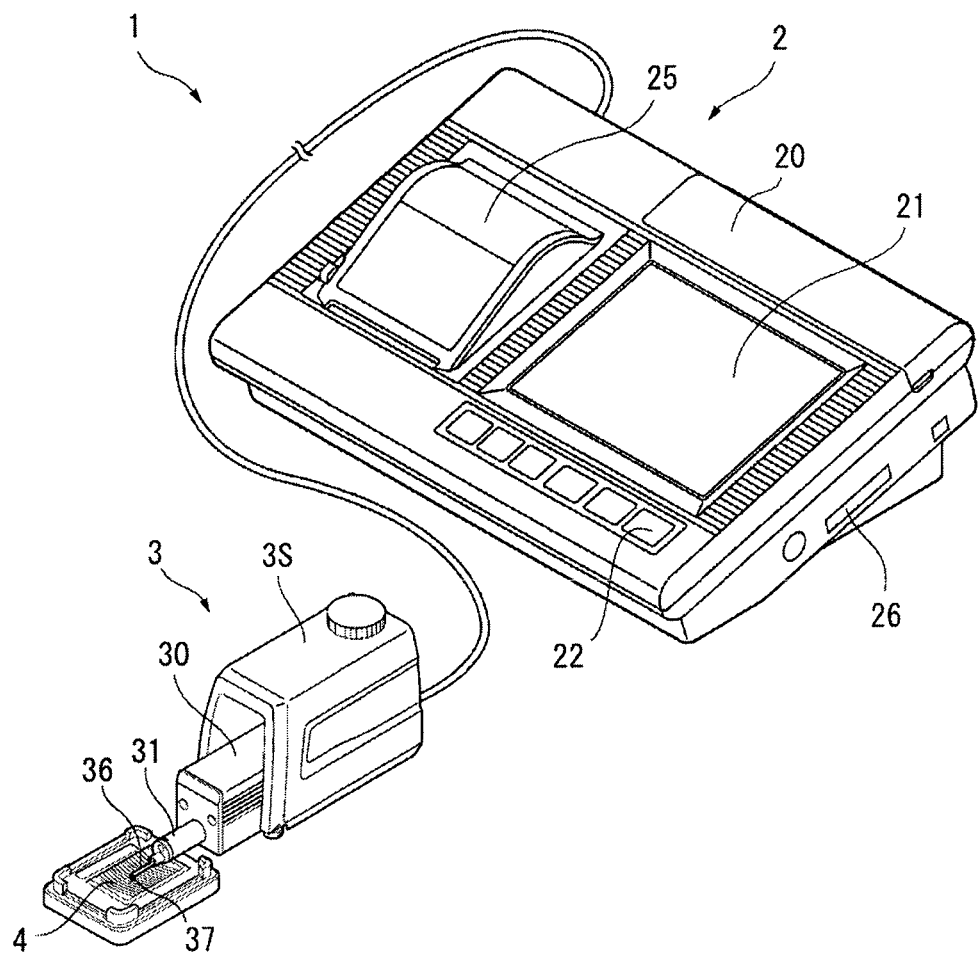
FIG. 1 is a perspective view showing an entirety of a device according to an embodiment of the present invention.
Figure 2:
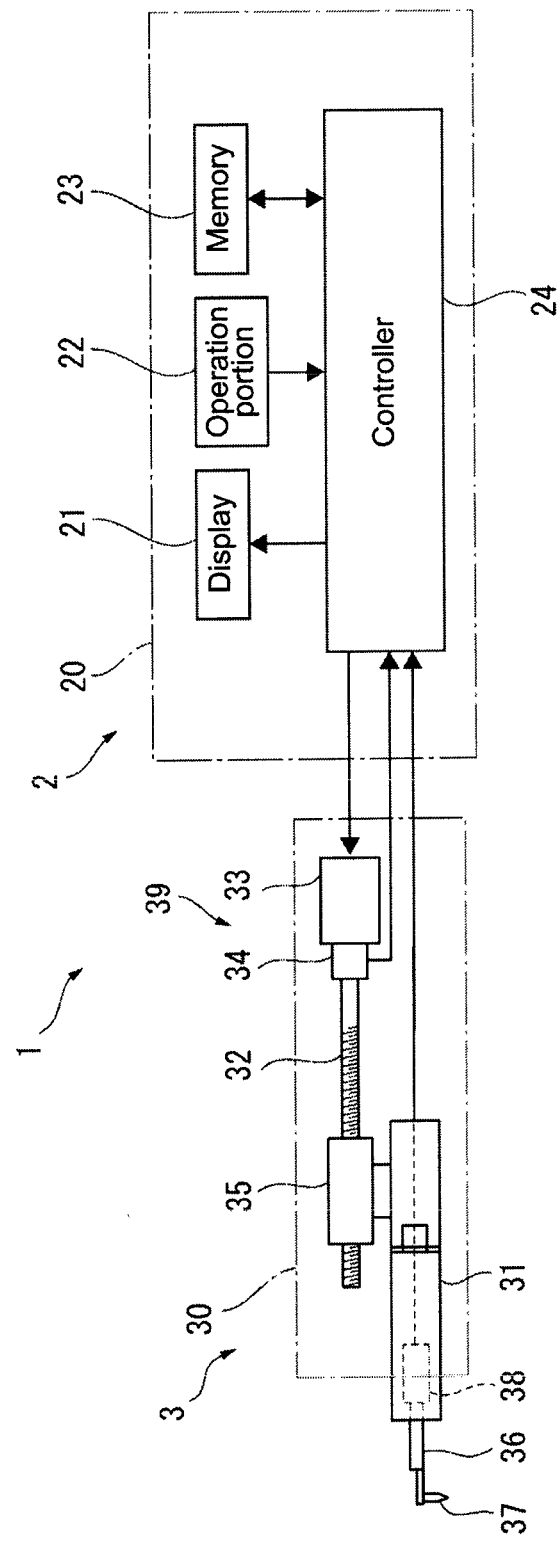
FIG. 2 is a block diagram showing a function structure according to the embodiment.

Hereinafter, an embodiment of the present invention is described with reference to the drawings. FIG. 1 is a perspective view showing an exterior of a portable surface texture measurement device. FIG. 2 shows an internal structure of the measurement device. As shown in these drawings, a surface texture measurement device 1 of the present embodiment includes an electric component 2 and a drive detector 3.

The electric component 2 has a display 21, such as a touch panel display, and an operation portion 22 (also referred to as an operational interface), such as a sheet switch, on a surface of a case 20. The electric component 2 further has a memory 23, such as a memory device, and a controller 24, which is a controller of the present invention, in an interior of the case 20. The controller 24 is configured with a small computer system to control each component of the surface texture measurement device 1 according to an operation program stored in the memory 23 to perform various processing. A printer 25 is provided to the surface of the case 20, and an input and output terminal 26 is provided to a side surface of the case 20.

The drive detector 3 has a movable block 31 in an interior of a case 30, the movable block 31 being supported by a guide rail (not shown in the drawings) so as to be able to move in a predetermined movement direction (left and right direction in the drawings). A ball screw shaft 32 is provided in parallel to the movement direction of the movable block 31. The ball screw shaft 32 is driven and rotated by an electric motor 33, which is a drive source. A rotation angle position of the ball screw shaft 32 is detected by a rotation encoder 34. The ball screw shaft 32 is screwed into a ball nut 35, which is connected to the movable block 31. The electric motor 33 and the rotation encoder 34 are connected to the controller 24. The controller 24 monitors the rotation angle position received from the rotation encoder 34 and controls operation of the electric motor 33. Thereby, the ball screw shaft 32 can be rotated to move the movable block 31 to a predetermined position. The ball screw shaft 32, the ball nut 35, the electric motor 33, and the rotation encoder 34 configure a drive mechanism 39.

A front end side of the movable block 31 is exposed from an opening on a side surface of the case 30. An arm 36 is provided to the exposed side, and a stylus 37 is fixed to a front end of the arm 36. The arm 36 extends along the movement direction of the movable block 31 and is swingably supported by the movable block 31. The front end of the arm 36 and the stylus 37 are displaced in a vertical direction (up and down direction in the drawings) in conjunction with swinging of the arm 36. A detector 38 is provided in an interior of the movable block 31 in order to detect a swing angle of the arm 36. By detecting the angle of the arm 36 with the detector 38, displacement of the stylus 37 can be detected. As shown in FIG. 1, the stylus 37 traces a surface of a work piece 4. When the stylus 37 is vertically displaced due to unevenness of the surface, a detection signal from the detector 38 is sent to and processed by the controller 24, and is then displayed, printed out, or recorded as a measurement value of a surface texture (i.e., surface roughness, filtered waviness profile, and contour). With reference to FIG. 1, the case 30 is supported by an up-down tilt unit 3S in order to adjust height and inclination of the stylus 37 with respect to the work 4.

Figure 3:
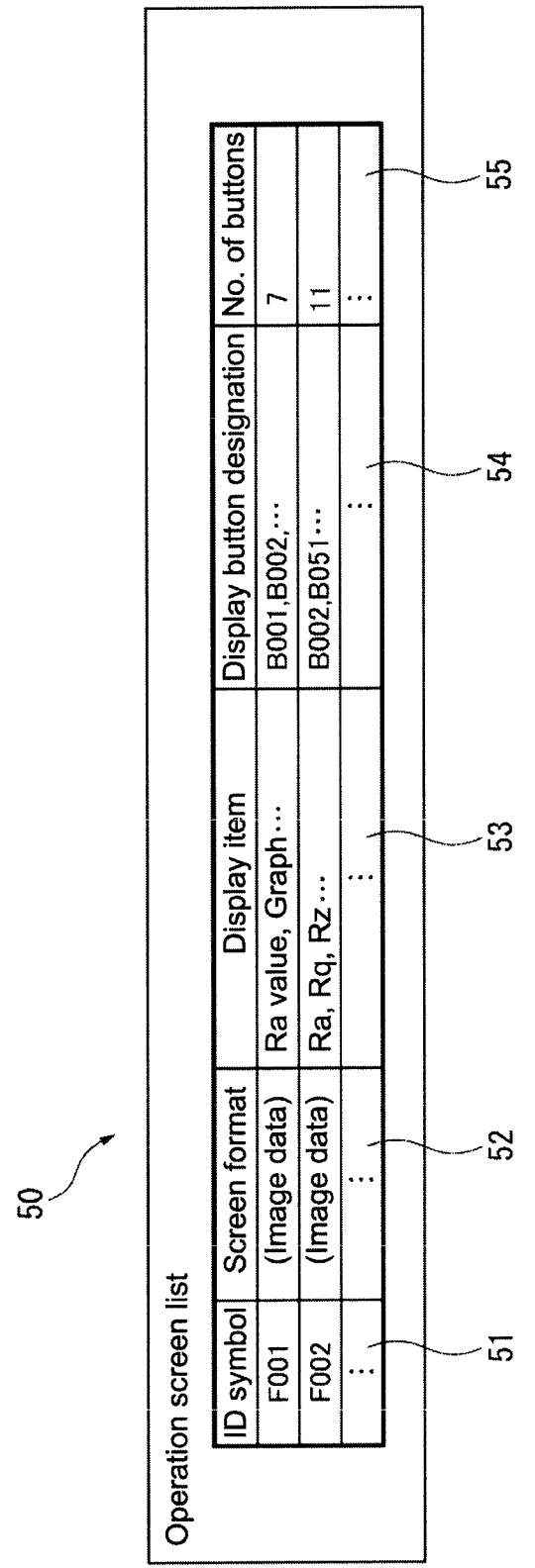
FIG. 3 is a schematic diagram of an operation screen list used in the embodiment.
Figure 5:
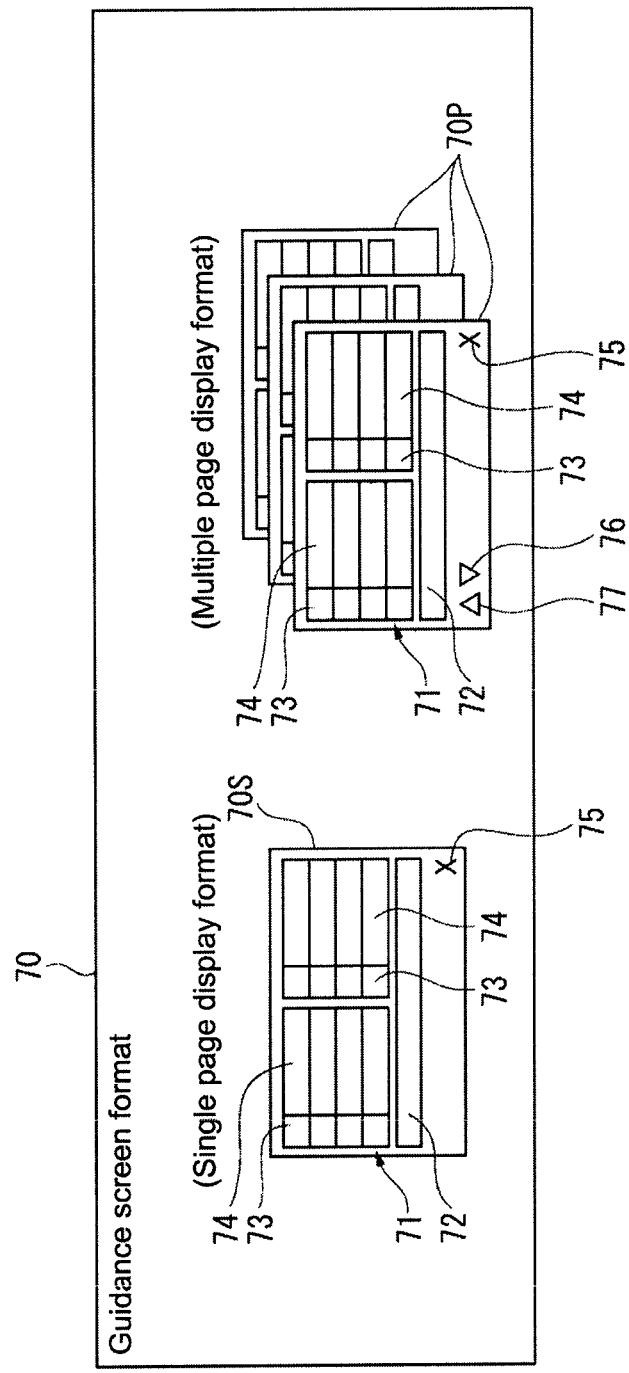
FIG. 5 is a schematic diagram of guidance screen formats used in the embodiment.

In the surface texture measurement device 1 of the present embodiment, display information shown in FIGS. 3 to 5 is stored in the memory 23 in order to display a guidance screen according to the present invention. The controller 24 performs a display operation in accordance with procedures shown in FIG. 6, and thereby, the guidance screen according to the present invention is displayed.

An operation screen list 50 in FIG. 3 is a list of recorded display information for a plurality of operation screens to be displayed in the display 21. The operation screen list 50 is a summary of display information for each operation screen made into a data set identified by an identification symbol 51. The data set for each operation screen includes data such as a screen format 52, a display item 53, a display button designation 54, and a number of buttons 55. The screen format 52 is image data which configures a frame and background of the operation screen. The display item 53 specifies measurement data to be displayed on the operation screen. The display button designation 54 specifies operation buttons to be displayed on the operation screen. The number of buttons 55 shows the number of buttons described above. Using the identification symbol 51, the display button designation 54 specifies data for each of the buttons, the data recorded in an operation button list 60 described in the following.

The operation button list 60 in FIG. 4 is a list of recorded data for the operation buttons provided on the plurality of operation screens displayed on the display 21. The operation button list 60 is a summary of display information for each operation button made into data sets identified by an identification symbol 61. The data set for each button includes data for each of a function 62, a graphic display icon 63, a text display icon 64 (64J, 64E, or 64C), a function name 65 (65J, 65E, or 65C), and a function description 66 (66J, 66E, or 66C). The function 62 defines processing to be performed when each button is operated. The graphic display icon 63 and the text display icon 64 (64J, 64E, and 64C) are image data displayed as a button. The function name 65 (65J, 65E, and 65C) is a name of the button. The function description 66 (66J, 66E, and 66C) describes details of a function of the button.

Figure 10:
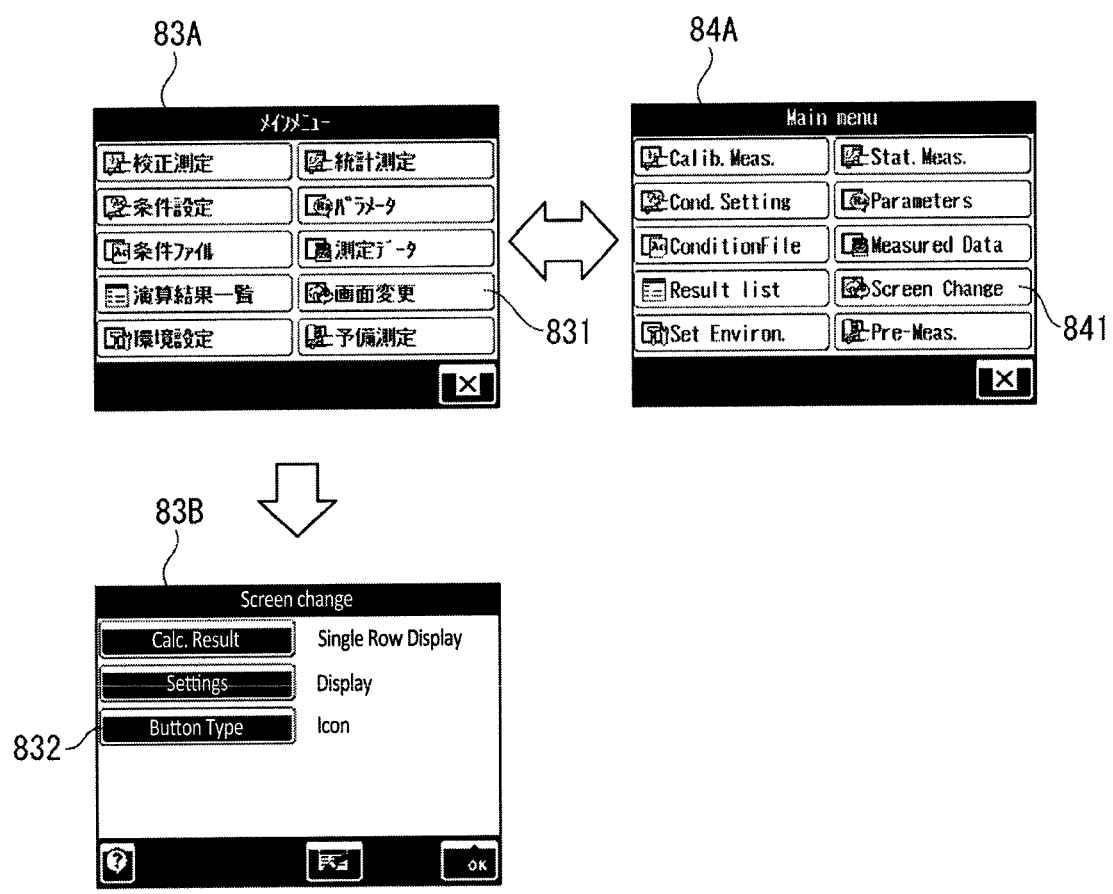
FIG. 10 is a schematic diagram showing setting screens of the embodiment.
Figure 11:
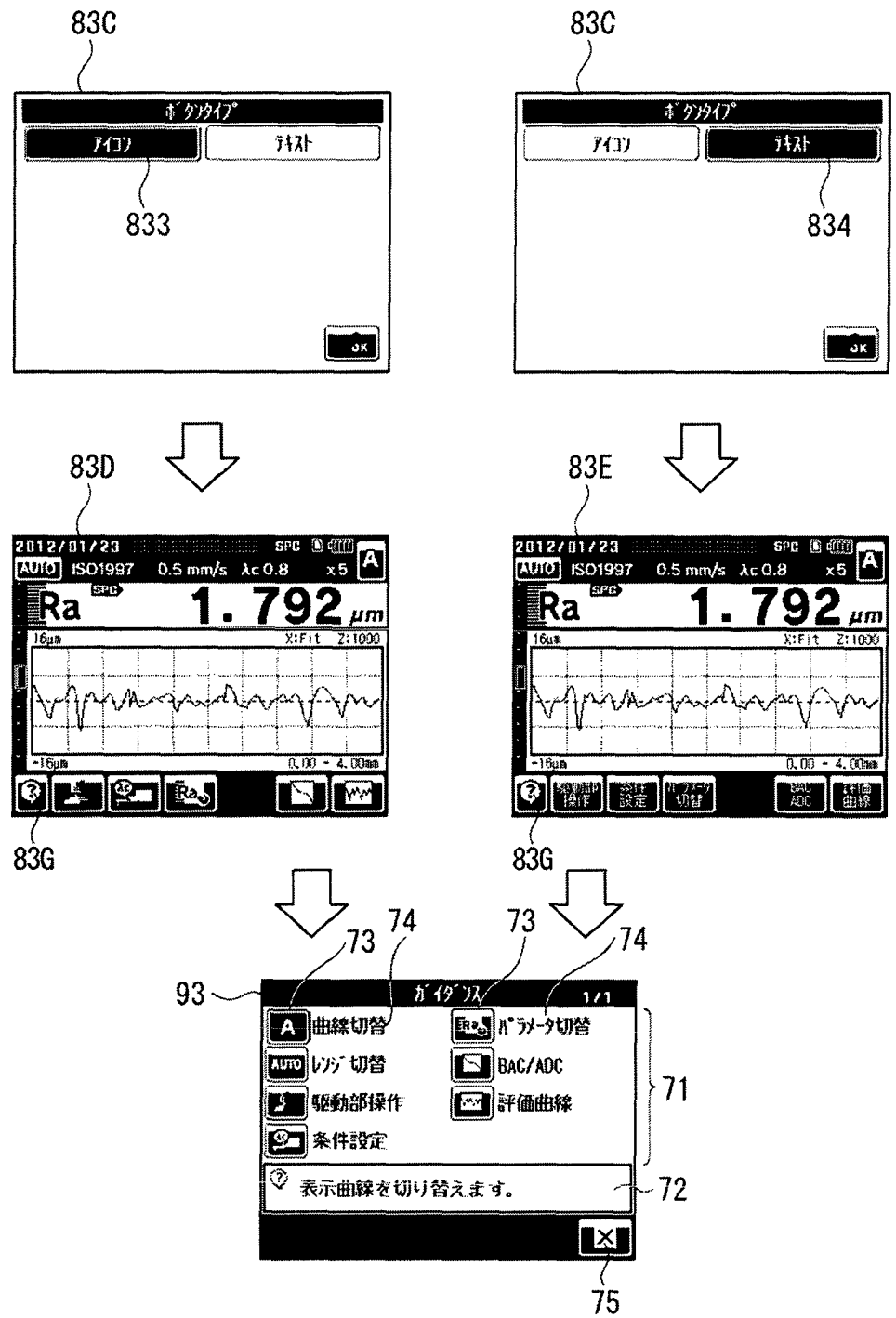
FIG. 11 is a schematic diagram showing switching of icon display of the embodiment.
Figure 12:
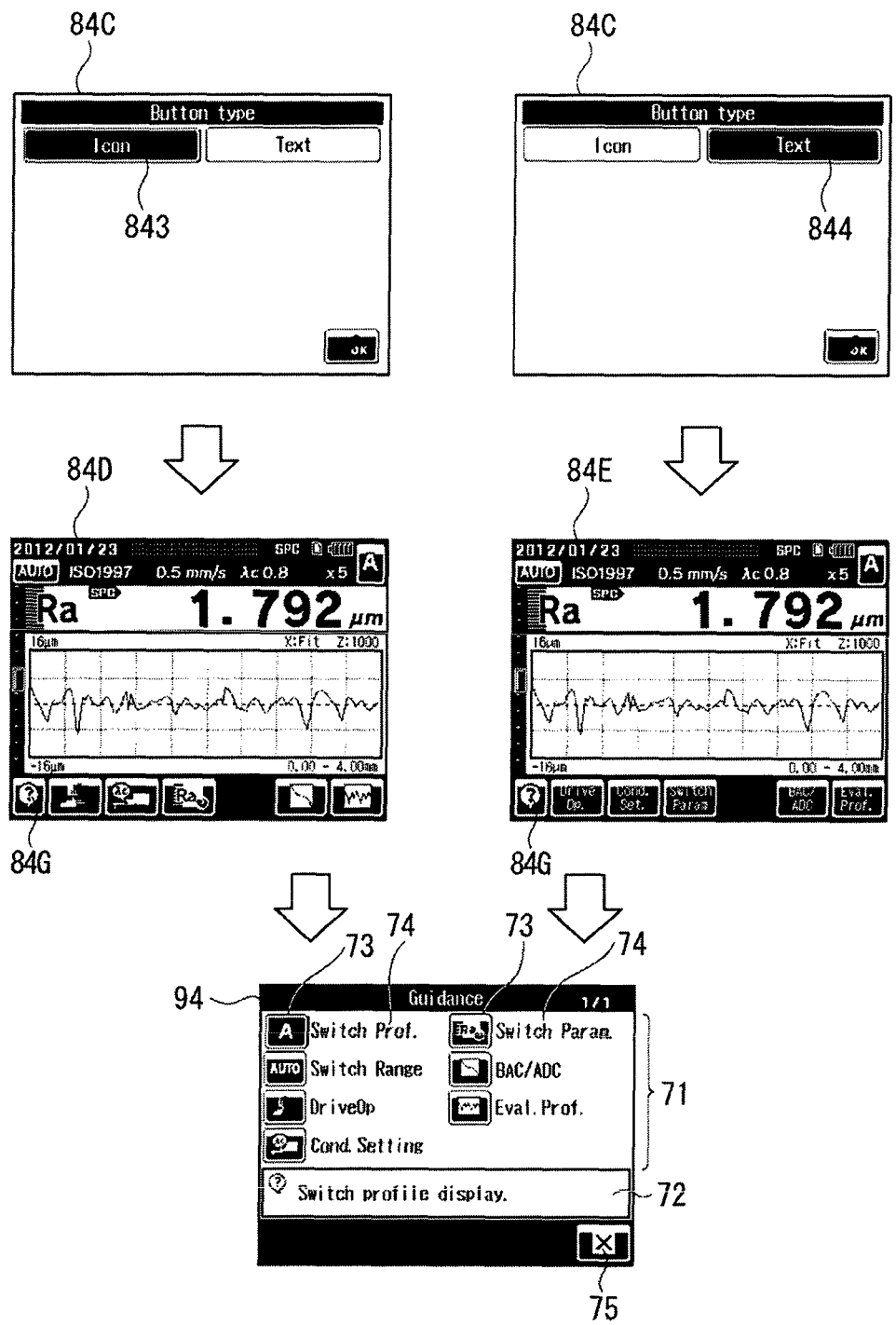
FIG. 12 is a schematic diagram showing switching of icon display of the embodiment.

Of these, the graphic display icon 63 is image data of a graphic that schematically shows the function of the button (see images on the left side in FIGS. 11 and 12). The text display icon 64 is image data of an abbreviated name of the button (see images on the right side in FIGS. 11 and 12). The text display icon 64, the function name 65, and the function description 66 are each configured with the text display icons 64J, 64E, and 64C; the function names 65J, 65E, and 65C; and the function descriptions 66J, 66E, and 66C, respectively, for different languages. The text display icon 64J is an icon image including text displayed in Japanese and showing the function of each button (see the right side in FIG. 11). The function name 65J and the function description 66J are a "button name" and a "detailed description of the function of the button," respectively, displayed in Japanese (see the left side in FIG. 10 and FIG. 11). The text display icon 64E is an icon image including text displayed in English and showing the function of each button (see the right side in FIG. 12). The function name 65E and the function description 66E display the same content in English (see the right side in FIG. 10 and FIG. 12). Similarly, the text display icon 64C, the function name 65C, and the function description 66C display the same content in Chinese (not shown in the drawings). This multilingual display may omit some of the languages or may include other additional display languages as needed. The data for the operation buttons is loaded from the display button designation 54 in each data set in the operation screen list 50 as well as from a guidance screen format 70 described in the following.

The guidance screen format 70 in FIG. 5 is a format for recorded data for a plurality of guidance screens displayed on the display 21. The guidance screen format 70 includes a single page display format 70S and a multiple page display format 70P. The single page display format 70S includes a button list field 71 on an upper side in the screen and a description display field 72 thereunder.

The button list field 71 has four rows of display frames in each of a left and right side, that is, eight display frames in total. An icon display 73 for a button is provided to a left end of each display frame, and a function name display 74 for the button is provided on the right side of the icon display 73. When the guidance screen is displayed, the button list field 71 displays information for operation buttons displayed on an origin operation screen from which the guidance screen has been called up. For example, when the origin operation screen is an operation screen specified by the data set whose identification symbol 51 is "F001" in the operation screen list 50 in FIG. 3, buttons "B001, B002 . . . " registered in the display button designation 54 in the data set are displayed on the operation screen. Display information for the buttons "B001, B002 . . . " specified here is loaded from the operation button list 60 in FIG. 4. The graphic display icon 63 or the text display icon 64, which are image data to be displayed as buttons, is displayed in the icon display 73, and the function name 65 is displayed in the function name display 74.

The description display field 72 has a frame that displays two rows of text. When any of the button displays is specified (touch operated, for example) in the button list field 71 described above, detailed information for the specified button is displayed in the description display field 72. For example, what is shown in the display frame on the upper left side of the button list field 71 may be a button specified by the data set whose identification symbol 61 is"B001" in the operation button list 60 in FIG. 4. The graphic display icon 63 or the text display icon 64 for the data set is displayed in the icon display 73 in the display frame. Similarly, the function name 65 is displayed in the function name display 74. When the icon display 73 or the function name display 74 is specified by a touch operation or the like at this point, the function description 66 in the data set corresponding to the button is selected. Thereby, the function description 66 is displayed in the description display field 72. An end button 75 is provided to a lower right side of the single page display format 70S to end display of the guidance screen.

In the single page display format 70S described above, the button list field 71 has eight display frames and thus can accommodate up to eight buttons on one screen. For example, for the data set whose identification symbol 51 is "F001" in the operation screen list 50 in FIG. 3, the number of buttons 55 is seven. Thus, the single page display format 70S can be used as the guidance screen for this operation screen. On the other hand, for the data set whose identification symbol 51 is "F002" in the operation screen list 50 in FIG. 3, the number of buttons 55 is eleven. Thus, instead of the single page display format 70S, the multiple page display format 70P is used as the guidance screen for this operation screen.

The multiple page display format 70P includes the button list field 71, the description display field 72, the icon display 73, the function name display 74, and the end button 75, similar to the single page display format 70S described above. The multiple page display format 70P further includes a next page button 76 and a previous page button 77 on the lower left side of the screen to go to a next or previous page, respectively. In the guidance screen display employing the multiple page display format 70P, a plurality of guidance screen displays are assigned. For example, when the number of buttons 55 is eleven as in the data set whose identification symbol 51 is "F002" in the operation screen list 50 in FIG. 3 described above, first to eighth buttons are shown in a first page and ninth to eleventh buttons are shown in a second page. The first and second pages can be switched by use of the next page button 76 and the previous page button 77. In each page, similar to the single page display format 70S described above, the function description can be displayed in the description display field 72 by specifying a button display in the button list field 71.

The controller 24 in the present embodiment operates according to the operation program stored in the memory 23. The controller 24 loads necessary data and formatting from the memory 23 in accordance with the user's operation of the operation portion 22, then displays the operation screen or the guidance screen on the display 21. Furthermore, the controller 24 stores, as a current system status, information including current operation screen designation information (what is currently being measured with what mode, for example), a display language (Japanese, English, or Chinese, for example), and an operation button display mode (whether the icons are displayed as graphics or text).

Figure 6:
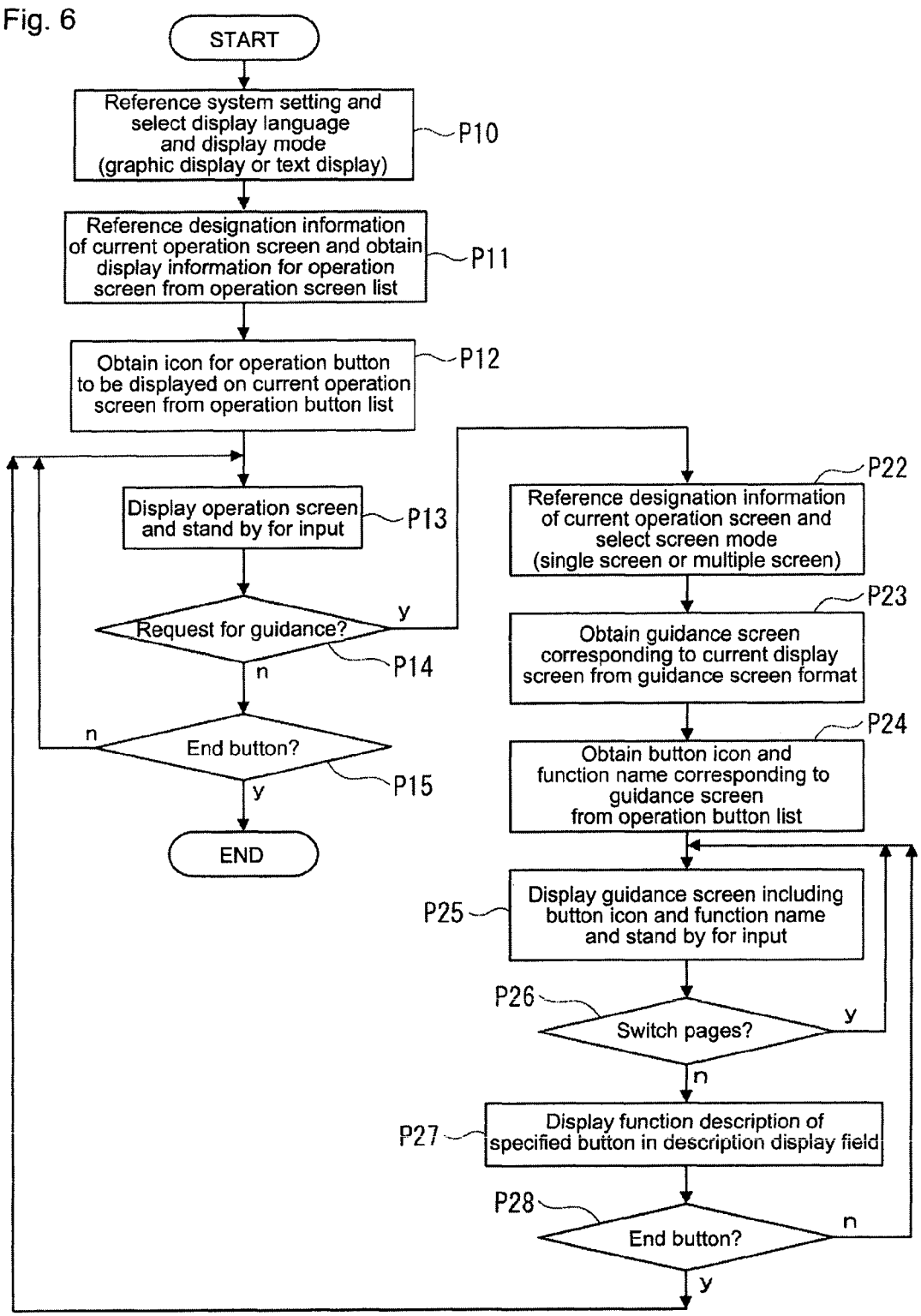
FIG. 6 is a flow chart showing procedures performed in the embodiment.

In FIG. 6, the controller 24 references the current system status and loads (process P10) a designation of the display language (Japanese, English, or Chinese) and a designation of the display mode (graphic display or text display). Next, the controller 24 selects an operation screen corresponding to the current operation screen from the operation screen list 50 (see FIG. 3) and obtains display information for the operation screen (process P11). Specifically, the controller 24 searches for the identification symbol 51 that matches the identification symbol ("F001," for example) indicating the current operation screen, then loads the screen format 52, the display item 53, and the display button designation 54 as display information from the data set corresponding to the identification symbol.

From the operation button list 60 (see FIG. 4), the controller 24 obtains display information for buttons corresponding to the buttons specified by the display button designation 54 in the obtained display information in order to display the buttons on the screen (process P12). Specifically, the controller 24 searches for the identification symbol 61 that matches the identification symbol ("B001," for example) indicating the buttons to be displayed on the current operation screen and loads the graphic display icon 63 or the text display icon 64 from the data set corresponding to the identification symbol based on the current system status.

After obtaining the display information, the controller 24 displays the operation screen on the display 21 and then stands by for the user's input to the operation portion 22 (process P13). When display is performed, the screen is configured based on information for the selected screen format 52. Information such as the measurement value specified by the display item 53 is displayed in a predetermined area, and the graphic display icon 63 or the text display icon 64, which acts as the operation button, is displayed in a predetermined portion.

An example of an operation screen 80 displayed as described above is shown on the left side in FIG. 7. The basic configuration of the operation screen 80 is set based on the information for the screen format 52. Specifically, a date display 80A and a status display 80B are provided to an upper portion of the operation screen 80. A current setting display 80C is provided to a row under the date display 80A and the status display 80B. A measurement value display 80D is provided to a middle portion of the operation screen 80. A button 801 displayed as "A" and a button 802 displayed as "AUTO" are provided to left and right sides of the setting display 80C, respectively. Buttons 803 to 806 for graphic display are also provided to a lowest portion in the operation screen 80. Furthermore, a button 80G for guidance screen display is provided to a left end of the lowest portion of the operation screen 80. Of these displays, icon images for the operation buttons 801 to 806 and 80G are each provided from the operation button list 60 (the graphic display icon 63 or the text display icon 64). Other items, position, size, and the like are provided from the operation screen list 50 as information for the screen format 52.

Figure 7:
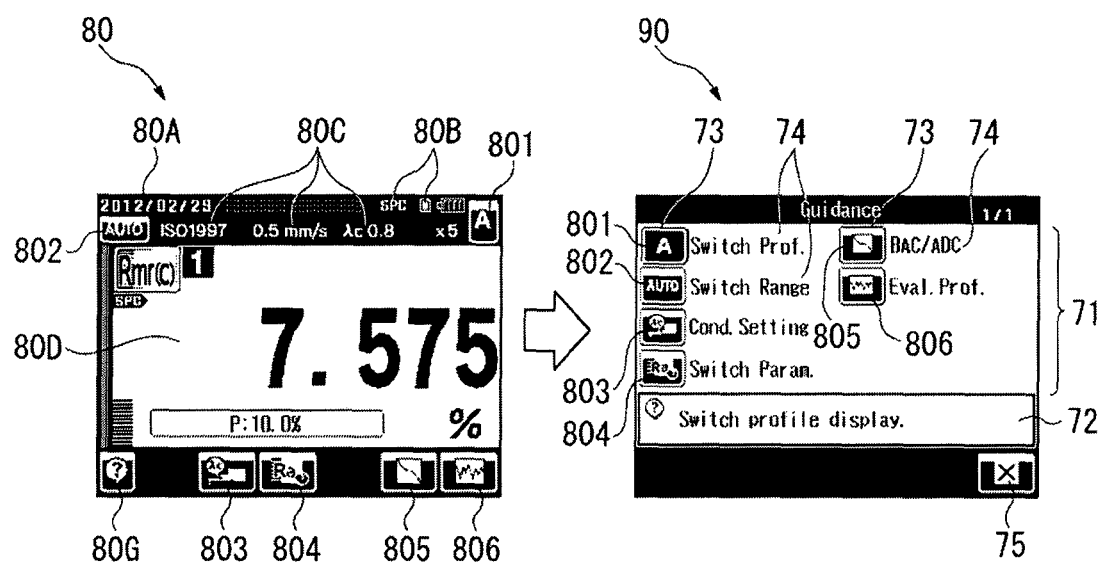
FIG. 7 is a schematic diagram showing an operation screen and a guidance screen of the embodiment.

With reference to FIG. 6 again, when the user performs an operation in a state where the operation screen 80 and the like in FIG. 7 described above are displayed, the controller 24 determines what kind of operation has been performed (process P14). When the operation has not been a request for guidance, the controller 24 determines whether or not the user has operated the end button (process P15). When the end button has been operated, the process ends. When the end button has not been operated, processing appropriate for the operation is performed and then the process goes back to process P13. Examples of the processing appropriate for the operation include starting or ending a measurement operation, changing to a setting mode, switching between screens, and the like. On the other hand, when the operation has been a request for guidance, the guidance screen is displayed.

An example of a guidance screen 90 is shown on the right side in FIG. 7. The guidance screen 90 employs the single page display format 70S described in FIG. 5 and includes the button list field 71 and the description display field 72, the button list field 71 being capable of displaying eight pairs of the icon display 73 and the function name display 74. The end button 75 is provided to a lower right area in the guidance screen 90 in order to end display of the guidance screen. The operation screen 80 (left side in FIG. 7), from which the guidance screen 90 has been opened, has a total of six operation buttons 801 to 806. Thus, six pairs of the icon display 73 and the function name display 74 are displayed in the button list field 71 of the guidance screen 90 (right side in FIG. 7).

With reference to FIG. 6 again, in order to display such a guidance screen 90, the controller 24 performs the following processes. First, the controller 24 references the system setting, then references the display information of the current operation screen and selects a screen mode (single screen or multiple screens) (process P22). Specifically, the controller 24 references the number of buttons specified by the data set in the operation screen list 50 corresponding to the current operation screen and selects the single screen (single page display) when the number of buttons is eight or less and selects the multiple screens (multiple page display) when the number of buttons is more than eight.

After the selection, the controller 24 obtains the single page display format 70S or the multiple page display format 70P from the guidance screen format 70 (see FIG. 5) and then configures the guidance screen 90 (process P23) based on either of these formats. At this point, the controller 24 loads a specified button displayed on the current operation screen 80 from the display button designation 54 of the data set corresponding to the current operation screen in the operation screen list 50. The controller 24 then loads the icon for the button (the graphic display icon 63 or the text display icon 64) (process P24) in order to display the information in the icon display 73 and the function name display 74 of the button list field 71. Once the guidance screen 90 is configured by these, the controller 24 displays the guidance screen 90 in the display 21 and stands by for the user's input to the operation portion 22 (process P25).

When the user performs an operation in a state where the guidance screen 90 is displayed, the controller 24 determines what kind of operation has been performed (process P26). For a case where the operation has been to switch between pages, details are described later. When the operation has not been to switch between pages and any of the buttons has been specified, the controller 24 loads the function description of the specified button from the function description 66 in the operation button list 60 and displays the function description in the description display field 72 (process P27). For operations other than the above, the controller 24 determines whether or not the end button 75 has been operated (process P28). When the end button 75 has been operated, the process goes back to the process P11. The guidance screen 90 employing the single page display format 70S is displayed by the processes described above.

Figure 8:
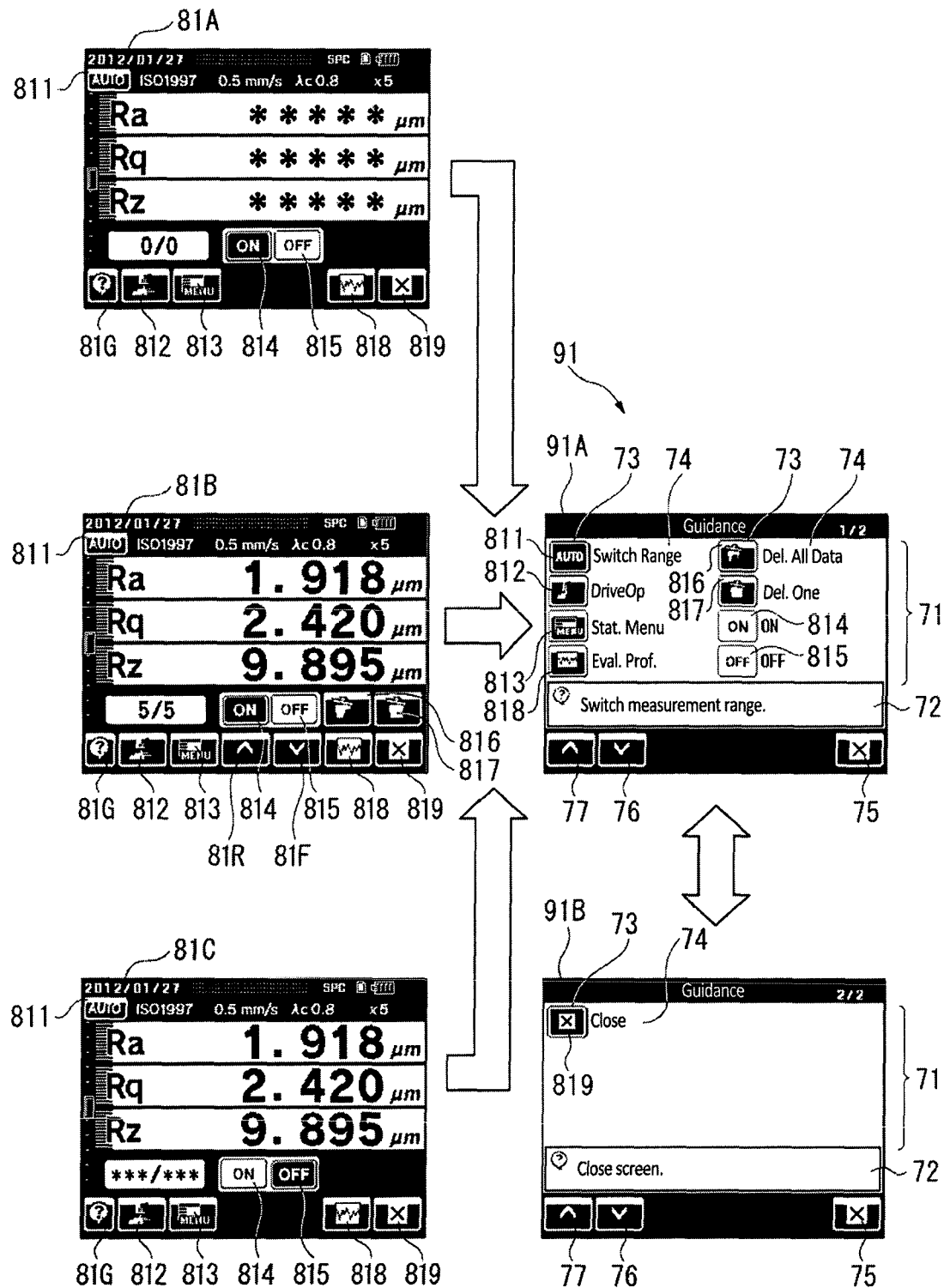
FIG. 8 is a schematic diagram showing the operation screens and the guidance screens of the embodiment.

Next, a guidance screen employing the multiple page display format 70P is described. Three operation screens 81A to 81C shown on the left side in FIG. 8 are screens displaying statistically processed measurement values "Ra," "Rq," and "Rz." The operation screen 81A shows a state before measurement (no measurement data); the operation screen 81B shows a state during measurement (statistical processing ON); and the operation screen 81C shows a state during measurement (statistical processing OFF).

The operation screens 81A to 81C each have a status display field or a value display field, which is shared among the operation screens, as well as operation buttons 811 to 815, 818, and 819, and a guidance screen display button 81G. In addition, the operation screen 81B includes a page forward button 81F, a page backward button 81R, and operation buttons 816 and 817. In the operation screens 81A and 81C, guidance is provided for the seven buttons 811 to 815, 818, and 819, whereas in the operation screen 81B, guidance is provided for nine buttons including the buttons 816 and 817, which exceeds a button list acceptable value of eight for the single page display format 70S. Thus, a guidance screen 91 of the operation screen 81B is displayed with two guidance screens 91A and 91B employing the multiple page display format 70P (see the right side in FIG. 8).

Of the buttons (nine in total) in the operation screen 81, eight buttons 811 to 818, eight being the maximum number, are displayed in the button list field 71 in the guidance screen 91A, which is the first page. Of the buttons on the operation screen 81, the button 819, which has not been displayed in the guidance screen 91A, is displayed in the button list field 71 in the guidance screen 91B, which is the second page. In each of the guidance screens 91A and 91B, the next page button 76 that moves pages forward and the previous page button 77 that moves pages backward are displayed to the left of the end button 75. With the next page button 76 and the previous page button 77, switching between the guidance screens 91A and 91B can be performed.

As described above, guidance is performed in the operation screens 81A and 81C for the seven buttons 811 to 815, 818, and 819, which can be displayed by use of the single page display format 70S. In other words, a setting is possible such that single page display is performed when the guidance screen is displayed in a state where the operation screens 81A and 81C are displayed, and multiple page display is performed when the guidance screen is displayed in a state where the operation screen 81B is displayed. Meanwhile, the operation screens 81A, 81B, and 81C are highly related to each other in the present embodiment. Thus, the guidance screens 91A and 91B for multiple page display, which are employed for the operation screen 81B, are used for all the operation screens 81A, 81B, and 81C. Thereby, a situation in which the highly related operation screens 81A and 81C have a different guidance screen from the operation screen 81B can be avoided, which makes providing an easily viewable guidance screen for the user possible.

Figure 9:
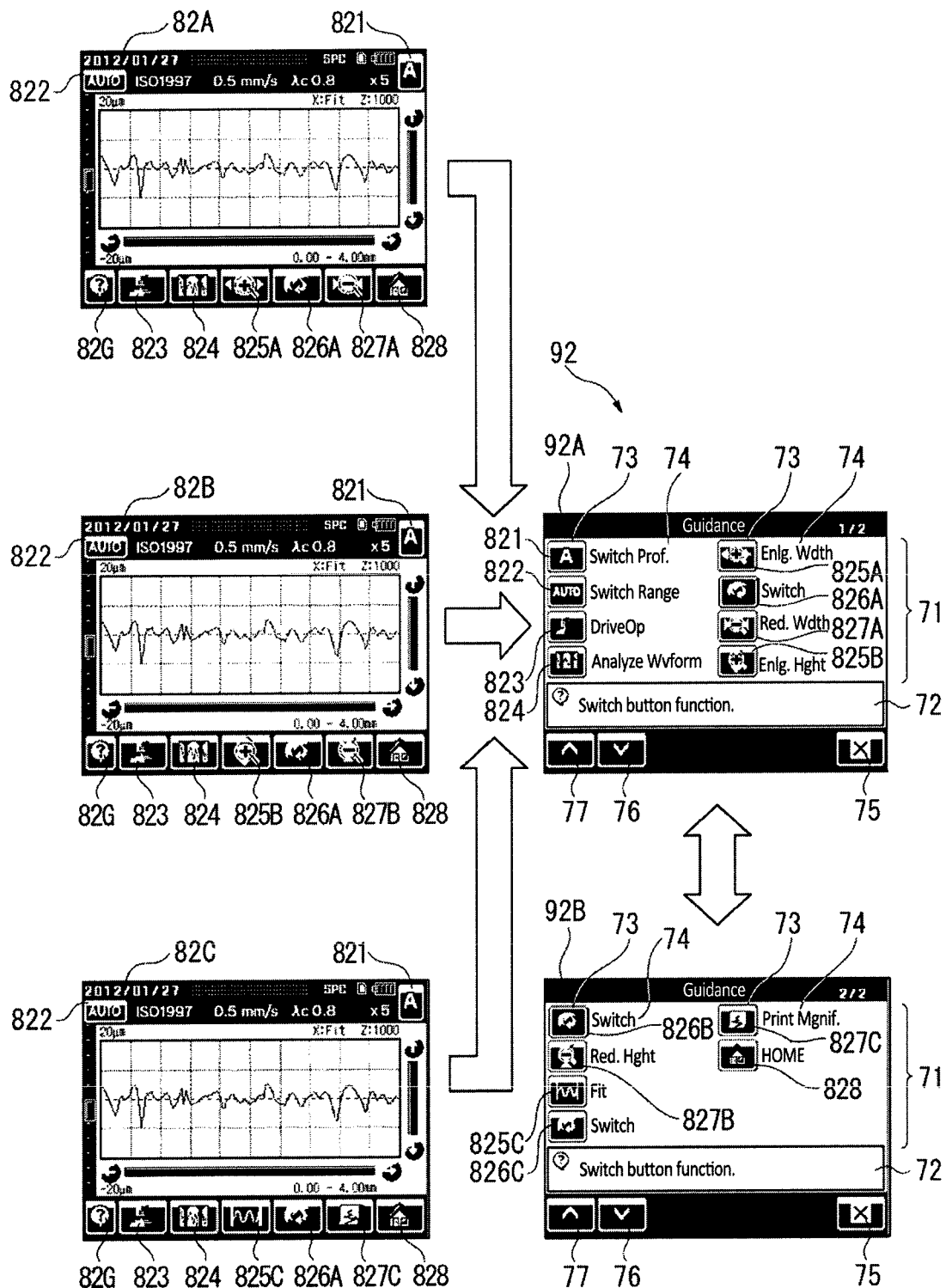
FIG. 9 is a schematic diagram showing the operation screens and the guidance screens of the embodiment.

With reference to FIG. 9, three operation screens 82A to 82C shown on the left side in the drawing are screens that show measurement values in a graph. These operation screens 82A to 82C each have a status display or a graph display area, which is shared among the operation screens, as well as operation buttons 821 to 824 and 828, and a guidance screen display button 82G. While the operation screen 82A has operation buttons 825A to 827A, the operation screen 82B has operation buttons 825B to 827B and the operation screen 82C has operation buttons 825C to 827C as buttons in the same positions. Accordingly, the three related operation screens 82A to 82C use fourteen buttons in total. Therefore, a guidance screen 92 called up from these operation screens 82A to 82C is shared and is shown with two screens, which are the guidance screens 92A and 92B each using the multiple page display format 70P (see the right side in FIG. 9).

Of the buttons on the operation screens 82A to 82C (fourteen in total), eight buttons 821 to 824, 825A to 827A, and 825B, eight being the maximum number, are displayed in the button list field 71 on the guidance screen 92A, which is the first page. The remaining buttons 826B and 827B, 825C to 827C, and 828, which have not been displayed on the guidance screen 92A, are displayed in the button list field 71 on the guidance screen 92B, which is the second page. In each of the guidance screens 92A and 92B, the next page button 76 that moves pages forward and the previous page button 77 that moves pages backward are displayed to the left of the end button 75. With the next page button 76 and the previous page button 77, switching between the guidance screens 92A and 92B can be performed.

Sharing the guidance screens 92A and 92B among the highly related operation screens 82A to 82C as described above enables providing the user with an easily viewable guidance screen. However, the operation screens 82A to 82C can have only eight operation buttons per screen; therefore, a single page display guidance screen may be provided to correspond to each screen.

As described above, the surface texture measurement device 1 of the present embodiment supports a plurality of languages including Japanese, English, and Chinese. For example, with reference to FIG. 10, a main menu screen 83A is displayed as a main menu when the display language in the system settings is Japanese, and a main menu screen 84A is displayed as the main menu when the display language in the system settings is English.

As described above, the surface texture measurement device 1 of the present embodiment can select the icon for operation button display from the graphic display icon 63 and the text display icon 64. This setting is selectable with a screen change menu in the main menu. In FIG. 10, when a "Screen Change" button 831 is pressed in the main menu screen 83A, a "Screen Change" screen 83B is opened. Furthermore, when a "Button Type" button 832 is pressed, a screen for button type setting is opened.

As shown on the left side in an upper tier in FIG. 11, when an "Icon" button 833 is selected in a "Button Type" screen 83C, a graphic display mode is selected for icon display of the buttons. As a result, when the operation buttons are displayed on each operation screen or each guidance screen described above, the image data of the graphic display icon 63 is used. As shown on the left side in a middle tier in FIG. 11, the operation buttons in an operation screen 83D are displayed with graphics. When a guidance screen display button 83G is pressed, a guidance screen 93 is displayed as shown in a lower tier in FIG. 11. The guidance screen 93 has components similar to the guidance screen 90 described above.

As shown on the right side in the upper tier in FIG. 11, when a "Text" button 834 is selected in the "Button Type" screen 83C, a text display mode is selected for icon display of the buttons. As a result, when the operation buttons are displayed on each operation screen or each guidance screen described above, the image data of the text display icon 64 is used. As shown on the right side in the middle tier in FIG. 11, the operation buttons in an operation screen 83E are displayed in text. When the guidance screen display button 83G is pressed, the guidance screen 93 is displayed as shown in the lower tier in FIG. 11. The guidance screen 93 has components similar to the guidance screen 90 described above.

FIG. 11 shows an example of display in Japanese, and FIG. 12 shows an example of display in English. In FIG. 10 described above, when a "Screen Change" button 841, which corresponds to the "Screen Change" button 831 described above, is pressed in the main menu screen 84A in a case where the display language is set to English, an English-display screen, which corresponds to the "Screen Change" screen 83B described above, is opened. When a button corresponding to the "Button Type" button 832 is pressed on the screen, the screen for button type setting is opened as shown in an upper tier in FIG. 12. Screens 84C, 84D, 84E, and 94 shown in FIG. 12 are screens displayed in English, which correspond to the screens 83C, 83D, 83E, and 93 in FIG. 11, respectively.

As shown on the left side in the upper tier in FIG. 12, when an "Icon" button 843 is selected in the "Button Type" screen 84C, the graphic display mode is selected for icon display of the buttons. As a result, when the operation buttons are displayed in each operation screen or each guidance screen described above, the image data (English display) of the graphic display icon 63 is used. As shown on the upper right side in FIG. 12, when a "text" button 844 is selected in the "Button Type" screen 84C, the text display mode is selected for icon display of the buttons. As a result, when the operation buttons are displayed in each operation screen or each guidance screen described above, the image data (English display) of the text display icon 64 is used.

As shown on the left and right sides in the middle tier in FIG. 12, the operation buttons in the operation screens 84D are displayed in graphics and the operation buttons in the operation screens 84E are displayed in text. When a guidance screen display button 84G is pressed, the guidance screen 94 is displayed as shown in the bottom in FIG. 12. The guidance screen 94 has components similar to those of the guidance screen 90 described above.

The present invention is not limited to the embodiment described above and includes modifications without departing from the scope of the present invention. For example, the maximum number of buttons in the single page display format is not limited to eight and may be other numbers. However, when there are too many buttons, displayed text on the small display 21 becomes too small. On the other hand, when there are too few buttons, use of the multiple page display format is increased, resulting in reduced operability. These circumstances are preferably considered when setting a proper maximum number in implementation.

Furthermore, display content and the screen layout of the guidance screen may be selected as needed when implemented. For example, the description display field 72 that displays the function description in text is provided in two lines in the above-described embodiment, but may be provided in only one line or in three lines or more. Moreover, specific procedures performed by software that displays guidance may be different as long as a similar function can be implemented. In the above description, touching the button display on the guidance screen immediately activated an operation to display the function description of each button in the description display field 72. However, the function description may be displayed by touching a button to select the button on the guidance screen, and then touching the button again in a selected state to display the description, for example. Alternatively, touching the button display in the guidance screen may display the description, and then touching the button again in the selected state may implement a corresponding function.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A portable surface texture measurement device, comprising:
    a display;
    an operational interface; and
    a controller configured to display in the display an operation screen and a guidance screen corresponding to a surface texture measurement operation with respect to the operational interface, wherein:
    the controller is further configured to display the operation screen in the display based on display information in a current surface texture measurement operation screen, and to display the guidance screen in the display based on actuation of a request for guidance button with respect to the operational interface;
    the operation screen includes an icon display for at least one button that activates a predetermined surface texture measurement function; and
    the guidance screen includes a button list field displaying as a list an icon and a function name for the button corresponding to and included in the current surface texture measurement operation screen, and a description display field displaying a surface texture measurement function description for any selected button of all buttons included in the current surface texture measurement operation screen.

2. The portable surface texture measurement device according to claim 1, wherein the guidance screen is displayed in a single page display format when a number of buttons included in the current surface texture measurement operation screen is equal to or less than the maximum button number for the button list field, and is further displayed in a multiple page display format when the number of buttons included in the current surface texture measurement operation screen is more than the maximum button number for the button list field.

3. The portable surface texture measurement device according to claim 2, wherein either one of a graphic display icon that shows the button function with graphics and a text display icon that shows the button function with abbreviated words is selected for the icon display based on a system setting.

4. The portable surface texture measurement device according to claim 3, wherein the function name and the function description are each selectable from a plurality of display languages based on the system setting.

5. The portable surface texture measurement device according to claim 2, wherein the function name and the function description are each selectable from a plurality of display languages based on the system setting.

6. The portable surface texture measurement device according to claim 1, wherein either one of a graphic display icon that shows the button function with graphics and a text display icon that shows the button function with abbreviated words is selected for the icon display based on a system setting.

7. The portable surface texture measurement device according to claim 6, wherein the function name and the function description are each selectable from a plurality of display languages based on the system setting.

8. The portable surface texture measurement device according to claim 1, wherein the function name and the function description are each selectable from a plurality of display languages based on the system setting.

* * * * *